US00RE34954E

United States Patent [19]

Haber et al.

[11] E Patent Number: Re. 34,954

[45] Reissued Date of Patent: May 30, 1995

[54] METHOD FOR SECURE TIME-STAMPING OF DIGITAL DOCUMENTS

[75] Inventors: Stuart A. Haber, New York, N.Y.; Wakefield S. Stornetta, Jr., Morristown, N.J.

[73] Assignee: Bell Communications Research, Inc., Livingston, N.J.

[21] Appl. No.: 156,120

[22] Filed: Nov. 22, 1993

Related U.S. Patent Documents

Reissue of:

[64] Patent No.: 5,136,647
Issued: Aug. 4, 1992
Appl. No.: 561,888
Filed: Aug. 2, 1990

[51] Int. Cl.[6] ..... H04L 9/00; H04L 9/30

[52] U.S. Cl. ..... 380/49; 380/23; 380/25; 380/30

[58] Field of Search ..... 380/3-5, 380/9, 10, 28, 30, 49, 50

[56] References Cited

U.S. PATENT DOCUMENTS

| | | | |
|---|---|---|---|
| 4,145,568 | 3/1979 | Ehrat | 380/50 X |
| 4,405,829 | 9/1983 | Rivest et al. | 380/30 |
| 4,625,076 | 11/1986 | Okamoto et al. | 380/23 |
| 4,868,877 | 9/1989 | Fischer | 380/25 |
| 4,881,264 | 11/1989 | Merkle | 380/25 |
| 4,972,474 | 11/1990 | Sabin | 380/49 X |
| 5,001,752 | 3/1991 | Fischer | 380/23 |

OTHER PUBLICATIONS

"New Directions in Cryptography", W. Diffie & M. E. Hellman, IEEE Trans. on Info. Theory, (vol. IT-22, Nov. 1976, pp. 644-654).

"Collision-Free Hash Functions & Public Key Signature Schemes", I. B. Damgdard, Advances in Cryptology-Eurocrypt '87, Springer-Verlag, LNCS, 1988, vol. 304, pp. 203-216.

"Pseudorandom Generation From One-Way Functions", R. Impagliazzo & L. A. Levin, Proc. 21st STOC, pp. 12-24, ACM, 1989.

"The MD4 Message Digest Algorithm", R. L. Rivest, Crypto '90 Abstracts, Aug. 1990, pp. 281-291.

Alan G. Konheim, Cryptography, A Primer; (John Wiley & Sons, Inc., 1981), pp. 331-333.

*Primary Examiner*—Bernarr E. Gregory

*Attorney, Agent, or Firm*—Leonard Charles Suchyta; Lionel N. White

[57] ABSTRACT

A system for time-stamping a digital document, including for example text, video, audio, or pictorial data, protects the secrecy of the document text and provides a tamper-proof time seal establishing an author's claim to the temporal existence of the document. Initially, the author reduces the document to a number by means of a one-way hash function, thereby fitting a unique representation of the document text. In one embodiment of the invention the number is then transmitted to an outside agency where the current time is added to form a receipt which is certified by the agency using a public key signature procedure before being returned to the author as evidence of the document's existence. In later proof of such existence, the certificate is authenticated by means of the agency's public key to reveal the receipt which comprises the hash of the alleged document along with the time seal that only the agency could have signed into the certificate. The alleged document is then hashed with the same one-way function and the original and newly-generated hash numbers are compared. A match establishes the identify of the alleged document as the time-stamped original. In order to prevent collusion in the assignment of a time stamp by the agency and thus fortify the credibility of the system, the receipt is linked to other contemporary receipts before certification by the agency, thereby fixing a document's position in the continuum of time. In another embodiment, a plurality of agencies are designated by means of random selection based upon a unique seed that is a function of the hash number of the document to be time-stamped. Thus being denied the ability to choose at will the identity of an agent, the author cannot feasibly arrange for falsification of a time stamp.

25 Claims, 3 Drawing Sheets

METHOD FOR SECURE TIME-STAMPING OF DIGITAL DOCUMENTS

Matter enclosed in heavy brackets [ ] appears in the original patent but forms no part of this reissue specification; matter printed in italics indicates the additions made by reissue.

BACKGROUND OF THE INVENTION

In many situations there is a need to establish the date on which a document was created and to prove that the text of a document in question is in fact the same as that of the original dated document. For example, in intellectual property matters it is often crucial to verify the date on which a person first put into writing the substance of an invention. A common procedure for thus "time-stamping" an inventive concept comprises daily notations of one's work in a laboratory notebook. Indelibly dated and signed entries are made one after another on each page of the notebook where the sequentially numbered, sewing pages make it difficult to revise the record without leaving telltale signs. The validity of the record is further enhanced by the regular review and signed witnessing by a generally disinterested third party. Should the time of the concept become a matter for later proof, both the physical substance of the notebook and the established recording procedure serve as effective evidence in substantiating the fact that the concept existed at least as early as the notebook witness date.

The increasingly widespread use of electronic documents, which include not only digital representations of readable text but also of video, audio, and pictorial data, now poses a serious threat to the viability of the "notebook" concept of establishing the date of any such document. Because electronic digital documents are so easily revised, and since such revisions may be made without telltale sign, there is available limited credible evidence that a given document truly states the date on which it was created or the message it originally carried. For the same reasons there even arises serious doubt as to the authenticity of a verifying signature. Without an effective procedure for ensuring against the surreptitious revision of digital documents, a basic lack of system credibility prevents the efficiencies of electronic documentation from being more widely implemented.

Some procedures are presently available for verifying electronic document transmissions; however, such procedures are limited in application to bilateral communications. That is, in such communications the sender essentially desires to verify to the receiver the source and original content of the transmitted document. For example, "private key" cryptographic schemes have long been employed for message transmission between or among a limited universe of individuals who are known to one another and who alone know the decrypting key. Encryption of the message ensures against tampering, and the fact that application of the private key reveals the "plaintext" of the transmitted message serves as proof that the message was transmitted by one of the defined universe. The time of creation of the message is only collaterally established, however, as being not later than its receipt by the addressee. This practice thus fails to provide time-stamp evidence that would be useful in an unlimited universe at a later date.

A more broadly applicable verifying communication procedure, that of "public key" cryptography, has been described by Diffie and Hellman ("New Directions in Cryptography", IEEE Transactions On Information Theory, Vol. IT-22, November 1976, pp. 644–654) and more recently implemented by Rivest et al. in U.S. Pat. No. 4,405,829, issued Sept. 20, 1983. While this scheme expands the utilizing universe to a substantially unlimited number of system subscribers who are unknown to one another, but for a public directory, verifiable communications remain bilateral. These limitations persist, since although a public key "signature", such as that which entails public key decryption of a message encrypted with the private key of the transmitter, provides any member of the unlimited universe with significant evidence of the identity of the transmitter of the message, only a given message recipient can be satisfied that the message existed at least as early as the time of its receipt. Such receipt does not, however, provide the whole universe with direct evidence of time of the message's existence. Testimony of such a recipient in conjunction with the received message could advance the proof of message content and time of its existence, but such evidence falls victim to the basic problem of ready manipulation of electronic digital document content, whether by originator or witness.

Thus, the prospect of a world in which all documents are in easily modifiable digital form threatens the very substance of existing procedures for establishing the credibility of such documents. There is clearly a significant present need for a system of verification by which a digital document my be so fixed in time and content that it can present, at least to the extent currently recognized in tangible documents, direct evidence on those issues.

SUMMARY OF THE INVENTION

The present invention yields such a reliable system in a method of time-stamping digital documents that provides the equivalent of two essential characteristics of accepted document verification. First, the content of a document and a time stamp of its existence are "indelibly" incorporated into the digital data of the document so that it is not possible to change any bit of the resulting time-stamped data without such a change being apparent. In this manner, the state of the document text is fixed at the instant of time-stamping. Second, the time at which the digital document is stamped is verified by a "witnessing" digital signature procedure that deters the incorporation of a false time statement. In essence, the method transfers control of the time-stamping step from the author to an independent agent and removes from the author the ability to influence the agent in the application of other than a truthful time stamp.

The method of the present invention presumes a number of document authors distributed throughout a communication network. Such authors may be individuals, companies, company departments, etc. each representing a distinct and identifiable, e.g. by ID number or the like, member of the author universe. In one embodiment of the invention, this universe may constitute the clientele of the time-stamping agency (TSA), while in another embodiment the distributed authors may serve as agents individually performing the time-stamping service for other members of the universe.

In its general application as depicted in FIG. 1 of the drawing, the present method entails an author's preparation of a digital document, which may broadly comprise any alphanumeric, audio, or pictorial presentation, and the transmission of the document, preferably in a condensed representative form, to the TSA. The TSA time-stamps the document by adding digital data signifying the current time, applying the agency's cryptographic signature scheme to the document, and transmitting the resulting document, now a certificate of the temporal existence of the original document, back to the author where it is held for later use in required proof of such existence.

To ensure against interception of confidential document information during transmission, and to reduce the digital bandwidth required for transmission of the entire document, the author may optimally convert the digital document string to a unique number having vastly reduced digital size by means of a deterministic function which may, for example, be any one of a number of algorithms known in the art as "oneway hash functions". Such an application of hash functions has been described, among others, by Damgard in his discussions on the improvement of security in document signing techniques ("Collision-Free Hash Functions and Public Key Signature Schemes", Advances in Cryptology—Eurocrypt '87, Springer-Verlag, LNCS, 1988, Vol. 304, pp. 203–217). In practice of the present invention, however, the "one-way" characteristic typical of a hashing algorithm serves an additional purpose;, that is, to provide assurance that the document cannot be revised subsequent to the time the TSA applies its time stamp.

A hashing function provides just such assurance, since at the time a document is hashed there is created a representative "fingerprint" of its original content from which it is virtually impossible to recover that document. Therefore, the time-stamped document is not susceptible to revision by any adversary of the author. Nor is the author able to apply an issued time-stamp certificate to a revised form of the document, since any change in the original content, even to the extent of a single word or a single bit of digital data, results in a different document that would hash to a completely different fingerprint number. Although the original document can thus not be recovered from the hashed document, a purported original document can nonetheless be proven by the fact that a true copy of the original document will always hash, assuming use of the same hashing algorithm, to the original number continued in the certificate.

Any available deterministic function. e.g. a one-way hash function such as that described by Rivest ("The MD4 Message Digest Algorithm", Advances in Cryptology—Crypto, '90, Springer-Verlag, LNCS, to appear), may be used in the present procedure. In the practice of the invention, such a hashing operation would normally be employed by the author to obtain the noted benefit of transmission security, although it might be effected by the TSA if the document were received in plaintext form. In whatever such manner the document content and incorporated time data are fixed against revision, there is, mains the further step, in order to promote the crucibility of the system, of certifying to the members of an as yet unidentified universe that the receipt was in fact prepared by the TSA, rather than by the author, and that the time indication is correct, i.e. that it has not, For instance, been fraudulently stated by the TSA in collusion with the author.

To satisfy the former concern, the TSA uses a verifiable signature scheme, of a type such as the public key method earlier noted, to certify the time-stamp prior to its transmittal to the author. Confirmation of the signature at a later time, such as by decryption with the TSA's public key, proves to the author and to the universe at large that the certificate originated with the TSA. Proof of the veracity of the time-stamp itself, however, relies upon a following additional aspect of the invention.

One embodiment of this segment of the process, as generally depicted in FIG. 2, draws upon the relatively continuous flow of documents from the universe of authors through the facilities of the TSA. For each given processed document $D_k$, the TSA generates a time-stamp receipt which includes, for example, a sequential receipt number, $r_k$, the identity of the author. $A_k$, by ID number $ID_k$, or the like, the hash, $H_k$, of the document, and the current time, $t_k$. In addition, the TSA includes the receipt dam of the immediately preceding processed document, $D_{k-1}$, of author, $A_{k-1}$, thereby bounding the timestamp of document, $D_k$, m the "past" direction by the malependently established earlier receipt time, $t_{k-1}$. Likewise, the receipt data of the next received document, $D_{k+1}$, are included to bound the time-stamp of document. $D_k$, in the "future" direction. The composite receipt, now containing the time data of the three, or more if desired, sequential time-stamp receipts, or identifying segments thereof, is then certified with the cryptographic TSA signature and transmitted to the author, $A_k$. In like manner, a certificate containing identifiable representations of $D_k$ and $D_{k+2}$ would be transmitted to author, $A_{k+1}$. Thus, each of the time-stamp certificates issued by the TSA is fixed in the continuum of time and none can be falsely prepared by the TSA, since a comparison of a number of relevant distributed certificates would reveal the discrepancy in their sequence. So effective is such a sequential fixing of a document in the me stream that the TSA signature could be superfluous in actual practice.

A second embodiment of the invention, shown generally in FIG. 3, distributes the time-stamping task randomly among a broad universe, for example the multiplicity of authors utilizing the time-stamping process. A TSA could still be employed for administrative purposes or the requesting author could communicate directly with the selected time-stamping author/agents. In either event, the above-mentioned need for assurance that a time-stamp has not been applied to a document through collusion between the author and the stamping agency is met in the combination of the reasonable premise that at least some portion of the agency universe is incorruptible or would otherwise pose a threat of exposure to an author attempting falsification, and the fact that the time-stamping agencies for a given document are selected from the universe entirely at random. The resulting lack of a capability on the part of the author to select a prospective collusive agent of the author's own choosing substantially removes the feasibility of intentional time falsification.

The selection of the individual universe members who will act as the predetermined number of agents is accomplished by means of a pseudorandom generator of the type discussed by Impagliazzo, Levin, and Luby ("Pseudorandom Generation From One-Way Functions", Proc. 21st STOC, pp. 12–24, ACM, 1989) for which the initial seed is a deterministic function, such as a hash, of the document being time-stamped. Given as a seed input the document hash or other such function, the implemented pseudorandom generator will output a series of agency IDs. This agency selection is for all practical purposes unpredictable and random.

Once the agents are selected, the time-stamping proceeds as previously indicated with the exception that each agent individually adds the current time data to the representative document it receives, certifies the resulting separate time-stamped receipt with its own verifiable cryptographic signature, and transmits the certificate back to the author. This transmittal may be directly to the requesting author or by way of the administrative TSA where the receipts are combined with or without further certification by the TSA. The combination of signature scheme and a published directory of author IDs provides verification of the utilization of the agents that were in fact selected by the pseudorandom generator. This distributed agent embodiment of the invention presents some advantages over the receiptlinking procedure in that a certified time-stamp is provided more quickly and a given author's later proof of a document is less reliant upon the availability of the certificates of other authors.

Additional variations in the process of the invention might include the accumulation of documents, preferably in hashed or other representative form, generated within an author organization over a period of time. e.g. a day or more depending upon the extent of activity, with the collection being hashed to present a single convenient document for time-stamping and certification. Also, the initial seed for the pseudorandom generator may be based upon a function of time or previously receipted documents, as well as of the document. The implementation of the process my be automated in simple computer programs which would directly carry out the described steps of hashing and transmitting original documents, selecting time-stamping agents, applying current time stamps, and returning certified receipts.

THE DRAWING

The present invention will be described with reference to the accompanying drawing of which:

DESCRIPTION OF THE INVENTION

The following examples of the application of embodiments of the present invention will serve to further describe the involved process. For convenience in the presentation of these examples, the deterministic function selected is the md4 hashing algorithm described by Rivest, as mentioned above, and the verifiable signature scheme is the public key method suggested by Diffie and Hellman as implemented by Rivest et al. in U.S. Pat. No. 4,405,829. Further, in order to simplify explanation of the process and for the additional reasons noted below, only representative segments of the entire numbers will be employed.

Figure 1:
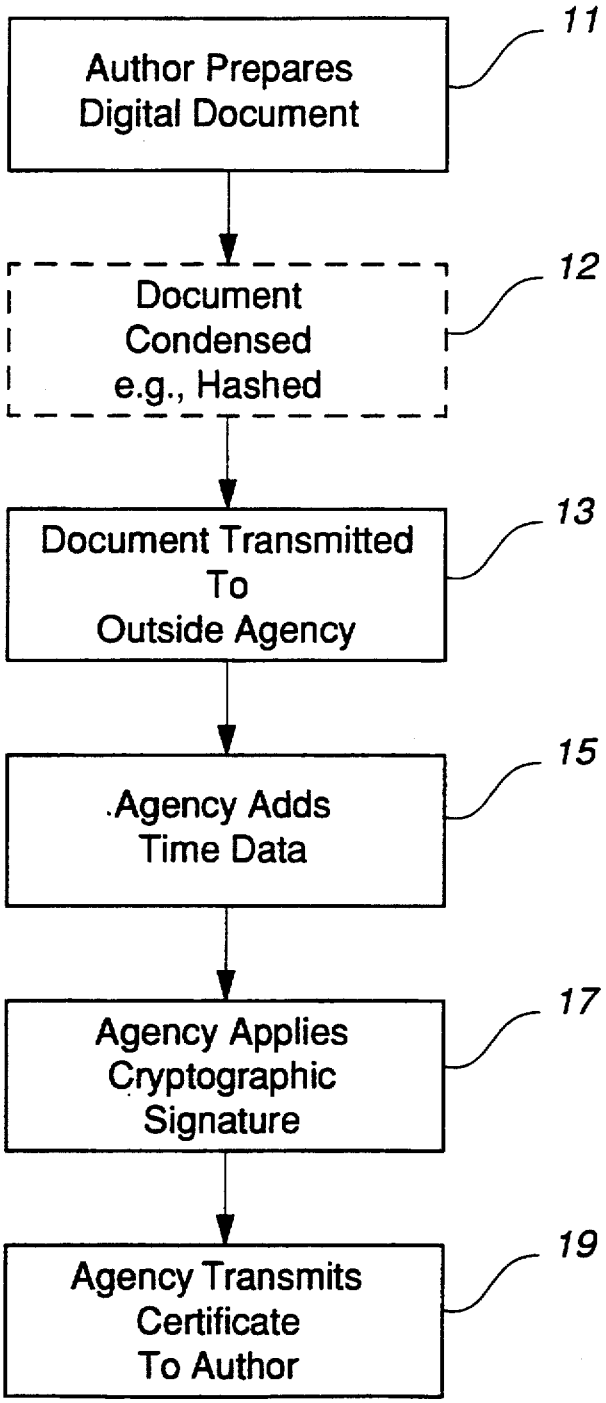
FIG. 1 is a flow diagram of the general process of time-stamping a document according to the invention.
Figure 2:
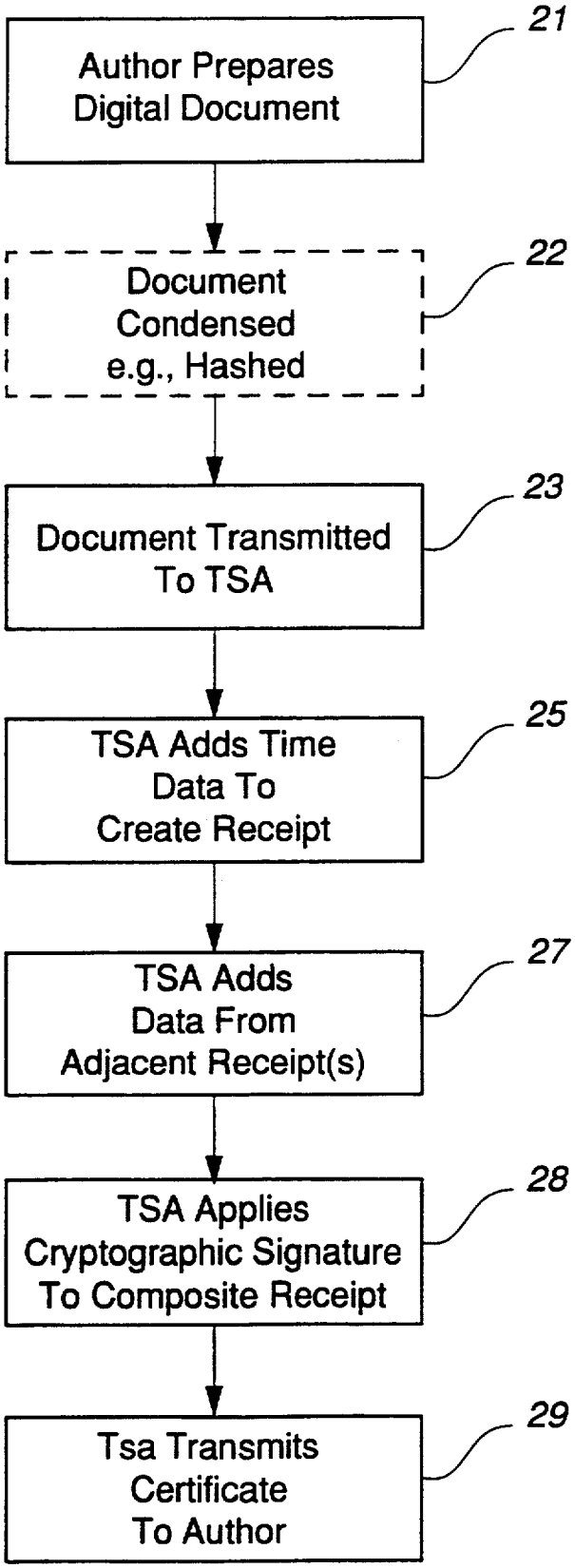
FIG. 2 is a flow diagram of a specific embodiment of the process.

The receipt-linking embodiment of the invention shown in FIG. 2 is initially considered. Although the present process may be used with documents of any length, the following apt excerpt is amply representative of a document, $D_k$, which an author prepares at step 21 and for which time-stamping is desired:

Time's glory is to calm contending kings, To unmask falsehood, and bring truth to light, To stamp the seal of time in aged things, To wake the morn, and sentinel the night, To wrong the wronger till he render right;

The Rape of Lucrece

By means of the md4 algorithm, the document is hashed, at optional dashed step 22, to a number, $H_k$, of a standard 128 bit format which expressed in base 16 appears as:

ef6dfdcd833f3a43d4515a9fb5ce3915

The author, $A_k$, whose system identification number $ID_k$, is 172 in a 1000 member author universe, transmits the thus-identified document to the system TSA, at step 22, as the message, $(ID_k,H_k)$, which appears:

172, ef6dfdcd833f3a43d4515a9fb5ce3915 as a request that the document be time-stamped.

The TSA then prepares the receipt for document, $D_k$, by adding, at step 25, a sequential receipt number, $r_k$, of 132, for example, and a statement of the current rinse, $t_k$. This time statement might include a standard 32 bit representation of computer clock time plus a literal statement, i.e. 16:37:41 Greenwich Mean Tune on Mar. 10, 1990, in order to allow the final time-stamp certificate to be easily readable by the author, $A_k$. The receipt would then comprise the string, $(r_k,t_k,ID_k,H_k)$.

At this point it would be appropriate to further consider the earlier-mentioned reduction of number size to representative segments. As is described by Rivest et al. in U.S. Pat. No. 4,405,829, the cryptographic public key scheme to be employed in this example (generally known in the field as the "RSA" signature scheme) requires the division of an extended message into blocks that may etch be represented by a number not exceeding the encoding key number element, n. Each such block is then signed with the RSA algorithm, to be reassembled after transmission. Therefore, in order to be able to use a number, n, of reasonable size in this example while maintaining a single block for the final receipt string to be certified with the RSA scheme, each element of the receipt string will be reduced to a representative eight bits, typically the last eight bits of any overlong string, and those bits will be sated in base 16 to present a two hexadecimal character string. Thus, for instance, the 128 bit document hash, $H_k$, will be represented by its last eight bits, i.e. 0001 0101, stated as 15 (base 16). Likewise, $ID_k$, 172, is 1010 1100 and is represented by ac (base 16). Without actually undertaking the calculation, it will suffice to assume that the time statement, $t_k$, is represented as 51. The receipt number, 132, would be represented as 84. The receipt string to this point, i.e. $(r_k,t_k,ID_k,H_k)$ now appears as 8451ac15.

Assume now that the immediately preceding document, $D_{k-1}$, was processed by the TSA as the request:

201, d2d67232a61d616f7b87dc146c575174 at 16:32:30 on Mar. 10, 1990 ($t_{k-1}$ being represented as 64). The TSA adds these data at step 27, to the receipt string for $D_k$ to yield the hexadecimal representation, 8451ac1564c974. This receipt $R_k$, now contains data fixing the time for $D_k$ and a time, $t_{k-1}$, before which author, $A_k$, cannot claim that $D_k$ existed. This limitation on $A_k$ is established by the fact that the previous author, $A_{k-1}$, holds a time certificate, $C_{k-1}$, that fixes $t_{k-1}$ as subsequent to the linked time data, $t_{k-2}$, in the certificate of author, $A_{k-2}$, and so on for as long as a proof requires.

To establish that TSA in fact originated the receipt for document, $D_k$, that receipt is transmitted, at step 29 to author. $A_k$, after TSA signing, at step 28, with the public key cryptographic signature scheme and becomes the certified receipt, or certificate, $C_k$. With the data derived above, and assuming that TSA has the RSA signature key set, in decimal:

<n,e> = <43200677821428109, 191> (Public)

<n/d> = <43200677821428109, 29403602422449791> (Private)

the signed certificate for $R_k$, 8451ac1564c974, would compute as:

$R^d \bmod n = 39894704664774392$

When author, $A_k$, receives this certificate, $C_k$, along with the literal statement of $R_k$, it may be readily confirmed as being correct by application of the TSA public key to verify that:

$C_k^e \bmod n = R_k$ and that $R_k$ in fact contains the data representing the document hash, $H_k$.

The procedure shown in this simple one-link example results in a certificate which, being bounded in time by the data from document, $D_k$, provides author, $A_{k-1}$ with reliable evidence that document, $D_{k-1}$, was not backdated to a time significantly prior to the existence of document, $D_k$. When the certificate of $A_k$ is expanded with additional data from the subsequently processed document, $D_{k+1}$, it will likewise be effectively bounded to substantiate the time stamp claimed by $A_k$. In an alternative of the same effect, $A_k$ could simply be advised of the identity of $A_{k+1}$ and could confirm from that author that the one-link certificate, $C_{k+1}$, contained the element, $H_k$. The procedure could also be varied to provide certified receipts which include data from any number of authors, with each addition providing a further degree of assurance against falsification.

Figure 3:
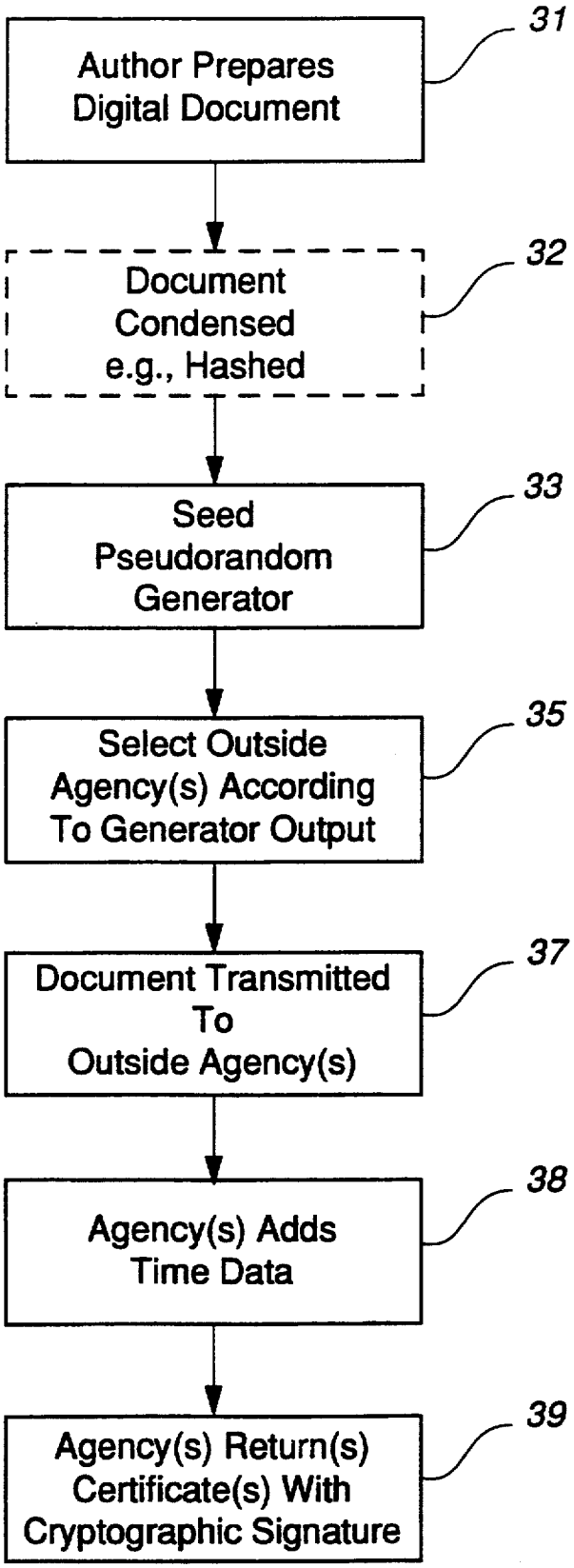
FIG. 3 is a flow diagram of another specific embodiment of the process.

Another embodiment of the invention, as shown in FIG. 3, which utilizes randomly selected members of the author universe as time-stamping agents, or witnesses, i.e. a "distributed trust" procedure, would proceed in the following manner. Although these numbers are not so limited in actual practice, for purposes of the example it will be assumed that the universe consists of 1000 authors, having IDs 0–999, and that three witnesses will be sufficient to establish the veracity of the time stamp. Also, in this example the earlier-noted variation including the services of a TSA is being implemented. The hashing function, md4, utilized in the above example is employed here also, in optional step 32, as an example of a deterministic document function which will seed the pseudorandom selection of the three witnesses from the author universe.

As in the previous example, the author transmits the document to the TSA, normally in hashed form, as the identified request:

172, ef6dfdcd833f3a43d4515a9fb5ce3915

The TSA now uses this document bash string, in step 33, as the seed to generate the ID number of the first witness, at step 35, according to the selection algorithm:

ID = {md4(seed)} mod(universe size)

The resulting seed hash:

26f54eae92511dbb5e06e7c2de6e0fcf represents the 128 bit number which mod 1000 is 487, the ID of the tint selected witness. The next witness is likewise chosen using this seed hash representation as the seed in the second selection computation to yield:

882653ee04d16b1f0d604883aa27300b which rood 1000, is 571, the second witness ID. A repeat of the computation, again seeding with the prior seed hash, selects the final witness as 598, which is:

2fe8768ef3532f15c40acf1341902cle mod 1000

The TSA now sends, at step 37, a copy of the original request to each of these three witnesses who individually, at step 38, add a current time statement and ID, and certify the resulting receipts by signing with the RSA cryptographic signature scheme and transmitting them, at step 39, directly to the author or through the TSA who may assemble the certificates into a file to be delivered to the author. By virtue of the fact that the pseudorandom generation prevents the exercise of a personal choice in the selection of witnesses, the author is deterred by the risk of encountering a non-cooperative witness from attempting any communication prior to time stamp certification for the purpose of arranging for a false time entry. In a process variant where the author is allowed to transmit the request directly to witnesses, the random selection of such witnesses which is keyed essentially to the involved document itself frustrates any attempt by the author to direct the document to a known cooperative witness. The group of resulting certificates my thus be employed with confidence in later proofs employing signature verification in the manner earlier described.

The procedures described and variants suggested herein for the practice of this time-stamping process and the various other embodiments which will become apparent to the skilled artisan in the light of the foregoing description are all nonetheless to be included within the scope of the present invention as defined by the appended claims.

What is claimed is:

1. A method of time-stamping a digital document which comprises:

a) transmitting a digital representation of said document from an originator to an outside agency;

b) creating at said outside agency a receipt comprising a digital representation of then current time and at least a portion of a digital representation of said digital document; and c) certifying said receipt at said outside agency by means of a verifiable digital cryptographic signature.

2. A method of time-stumping a digital document according to claim 1 wherein said transmitted digital document representation comprises at least a portion of the digital representation of the number derived by application of a deterministic function algorithm to said digital document.

3. A method of time-stamping a digital document according to claim 1 wherein said receipted digital document representation comprises at least a portion of the digital representation of the number derived by application of a deterministic function algorithm to said digital document.

4. A method of time-stamping a digital document according to claim 3 wherein said digital number representation is derived from the application of a one-way hashing algorithm to said digital document.

5. A method of time-stamping a digital document according to claim 1 wherein said receipt further comprises the time representation and digital document representation specific to at least one other digital document receipted by said outside agency.

6. A method of time-stamping a digital document according to claim 5 whereto the receipt of said at least one other digital document was created by said outside agency earlier than that of the currently receipted digital document.

7. A method of time-stamping a digital document according to claim 5 wherein the receipt of said at least one other digital document was created by said outside agency later than that of the currently receipted digital document.

8. A method of time-stamping a digital document according to claim 1 wherein aid outside agency is selected at random from a predetermined universe.

9. A method of time-stamping a digital document according to claim 8 wherein said outside agency is selected by means of a pseudorandom generator seeded with at least a portion of the digital representation of the number derived by application of a deterministic function algorithm to said digital document.

10. A method of time-stamping a digital document according to claim 9 wherein said pseudorandom generation seed is derived from the application of a one-way hashing algorithm to said digital document.

11. A method of time-stamping a digital document according to claim 10 which further comprises the like preparation of a time-stamp certificate by at least one additional outside agency selected by said pseudorandom generation and wherein the input for each additional outside agency selection is at least a portion of the digital representation of the output derived from the application of said one-way hashing algorithm to a digital representation of the previously generated output.

12. A method of time-stamping a digital document according to claim 9 which further comprises the like preparation of a time-stamp certificate by at least one additional outside agency selected by said pseudorandom generation.

13. A method for the secure time-stamping of a digital document characterized in that a) a digital representation of said document is transmitted from an originator to an outside agency;

b) said outside agency creates a receipt comprising a digital representation of then current time and at least a portion of a digital representation of said digital document; and c) said receipt is certified al said outside agency by means of a verifiable digital cryptographic signature scheme.

14. A method for the secure time-stamping of a digital document according to claim 13 characterized in that said receipt further comprises the time representation and digital document representation specific to at least one other digital document receipted by said outside agency.

15. A method for the secure time-stamping of a digital document according to claim 14 characterized in that the receipt of said at least one other digital document was created by said outside agency later than that of the currently receipted digital document.

16. A method for the secure time-stamping of a digital document according to claim 13 characterized in that said outside agency is selected at random from a predetermined universe by means of a pseudorandom generator seeded with at least a portion of the digital representation of the number derived from the application of a deterministic function algorithm to said digital document.

17. A method for the secure time-stamping of a digital document according to claim 16 characterized in that said seed is derived from the application of a one-way hashing algorithm to said digital document.

18. A method for the secure time-stamping of a digital document according to claim 16 characterized in that a time-stamp certificate for said digital document is likewise prepared by at least one additional outside agency selected by means of said pseudorandom generation.

*19. A method for time stamping a particular digital document comprising*

*(a) forming a collection of hash values by hashing each group comprised of one or more digital documents in an accumulation of digital documents, including said particular digital document, generated over a period of time,*

*(b) forming a single hash value representative of said collection of hash values, and*

(c) creating a time stamp receipt for said particular digital document by associating an indication of then current time with said single hash value.

*20. A method for time stamping a particular digital document comprising*

*(a) forming a collection of digital values by applying a deterministic function to each digital document or group of digital documents in an accumulation of digital documents, including said particular document, generated over a period of time,*

*(b) forming a single digital value from said digital values in said collection, and*

*(c) creating a time stamp receipt for said particular digital document by associating an indication of then current time with said single digital value.*

*21. A method for time stamping a particular digital document in a series of digital documents comprising the steps of*

*(a) forming a receipt comprising at least a portion of a digital representation of said particular digital document and a digital representation of time then current as of the forming of said receipt,*

*(b) forming at least one different receipt comprising at least a portion of a digital representation of at least one different digital document in said series of digital documents and a digital representation of time then current as of the forming of said at least one different receipt, and*

*(c) utilizing said receipts to form a composite receipt which is thereby fixed in the continuum of time.*

*22. A method for time stamping a particular digital document in a relatively continuous flow of digital documents comprising the steps of*

*(a) forming a receipt comprising at least a portion of a digital representation of said particular digital document,*

*(b) forming at least one different receipt comprising at least a portion of a digital representation of at least one different digital document in said relatively continuous flow of digital documents, and*

*(c) utilizing said receipts to form a composite receipt which is thereby fixed in the continuum of time.*

*23. A method for time stamping a particular digital document comprising the steps of*

*(a) at an originator, forming a particular digital value representative of said particular digital document by applying a deterministic function to said particular digital document,*

*(b) transmitting said particular digital value to a time stamping agency,*

*(c) at said time stamping agency, forming a collection of digital values, including said particular digital value, and forming a single digital value from the digital values in said collection, and*

*(d) creating a time stamp receipt for said particular digital document by associating with said single digital value a representation of then current time.*

*24. The method of claim 23 wherein said particular digital value representative of said particular digital document is a particular hash value, said deterministic function is a hash function, said collection of digital values including said particular digital value is a collection of hash values including said particular hash value, and said single digital value is a single hash value representative of said collection of hash values.*

*25. A method for time stamping a particular digital document comprising the steps of*

*(a) at an originator, forming a particular digital representation of said particular digital document,*

*(b) transmitting said particular digital representation to a time stamping agency,*

*(c) at said time stamping agency, forming a receipt comprising at least a portion of said particular digital representation of said particular digital document,*

*(d) at said time stamping agency, forming at least one different receipt comprising at least a portion of a digital representation of at least one different digital document, and*

*(e) forming from said receipts a composite receipt which is thereby fixed in time.*

* * * * *